United States Patent
Horikoshi et al.

(10) Patent No.: US 9,561,695 B2
(45) Date of Patent: Feb. 7, 2017

(54) TIRE INTERNAL PRESSURE WARNING SYSTEM

(71) Applicant: BRIDGESTONE CORPORATION, Chuo-ku, Tokyo (JP)

(72) Inventors: Shotaro Horikoshi, Tokyo (JP); Kazuma Nakazawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 34 days.

(21) Appl. No.: 14/427,490

(22) PCT Filed: Sep. 10, 2013

(86) PCT No.: PCT/JP2013/005353
§ 371 (c)(1),
(2) Date: Mar. 11, 2015

(87) PCT Pub. No.: WO2014/057609
PCT Pub. Date: Apr. 17, 2014

(65) Prior Publication Data
US 2015/0239307 A1    Aug. 27, 2015

(30) Foreign Application Priority Data

Oct. 11, 2012 (JP) .................................. 2012-226002
Dec. 18, 2012 (JP) .................................. 2012-276074

(51) Int. Cl.
*B60C 23/00* (2006.01)
*B60C 23/02* (2006.01)
(Continued)

(52) U.S. Cl.
CPC ....... *B60C 23/0433* (2013.01); *B60C 23/0401* (2013.01); *B60C 23/0408* (2013.01);
(Continued)

(58) Field of Classification Search
None
See application file for complete search history.

(56) References Cited

U.S. PATENT DOCUMENTS 5,252,946 A    10/1993  Walker et al.
5,801,306 A *   9/1998  Chamussy .......... B60C 23/0408
                                              340/442
(Continued)

FOREIGN PATENT DOCUMENTS

CN    1479678 A     3/2004
CN    2744544 Y    12/2005
(Continued)

OTHER PUBLICATIONS

International Search Report for PCT/JP2013/005353 dated Dec. 17, 2013 [PCT/ISA/210].

*Primary Examiner* — Travis Hunnings
(74) *Attorney, Agent, or Firm* — Sughrue Mion, PLLC

(57) ABSTRACT

The present invention provides a tire internal pressure warning system, comprising: an internal pressure data acquisition apparatus for obtaining data of internal pressure of each tire 5 of a vehicle 6 (a TPMS sensor transmitter 1 and a TPMS receiver 2); and an information terminal device 3 for determining whether there is a puncture-based failure or a failure resulting from a natural pressure drop, based on a change in the internal pressure of each tire received from the TPMS receiver 2, and displaying a warning in accordance with the failure condition.

9 Claims, 3 Drawing Sheets

(51) Int. Cl.
*B60C 23/04* (2006.01)
*G01L 17/00* (2006.01)

(52) U.S. Cl.
CPC ...... *B60C 23/0474* (2013.01); *B60C 23/0477* (2013.01); *B60C 23/0479* (2013.01); *G01L 17/00* (2013.01)

(56) References Cited

U.S. PATENT DOCUMENTS

| | | | |
|---|---|---|---|
| 6,450,020 B1 | 9/2002 | Naito et al. | |
| 2001/0029410 A1* | 10/2001 | Obradovich | B60G 17/0195 701/1 |
| 2002/0044051 A1 | 4/2002 | Sugisawa | |
| 2005/0242936 A1 | 11/2005 | Watabe | |
| 2010/0164704 A1* | 7/2010 | Lindskog | B60C 23/062 340/442 |

FOREIGN PATENT DOCUMENTS

| | | |
|---|---|---|
| DE | 10 2008 049 045 A1 | 4/2010 |
| EP | 1813447 A2 | 8/2007 |
| JP | 4-262907 A | 9/1992 |
| JP | 10-6723 A | 1/1998 |
| JP | 2001-63327 A | 3/2001 |
| JP | 2002-81945 A | 3/2002 |
| JP | 2002-211217 A | 7/2002 |
| JP | 2004-13449 A | 1/2004 |
| JP | 2004-82905 A | 3/2004 |
| JP | 2004-314727 A | 11/2004 |
| JP | 2005-313761 A | 11/2005 |
| JP | 3910252 B2 | 4/2007 |
| JP | 2007-176218 A | 7/2007 |
| JP | 2008-149863 A | 7/2008 |
| JP | 2010-521366 A | 6/2010 |
| WO | 2009/127733 A1 | 10/2009 |

* cited by examiner

TIRE INTERNAL PRESSURE WARNING SYSTEM

CROSS REFERENCE TO RELATED APPLICATIONS

This application is a National Stage of International Application No. PCT/JP2013/005353, filed on Sep. 10, 2013, which claims priority from Japanese Patent Application Nos. 2012-226002, filed on Oct. 11, 2012, and 2012-276074, filed Dec. 18, 2012, the contents of all of which are incorporated herein by reference in their entirety.

TECHNICAL FIELD

The present invention relates to a tire internal pressure warning system for alarming abnormality of a tire.

BACKGROUND ART

There have been proposed in recent years as a method for checking whether air pressure (internal pressure) of an air-inflated pneumatic tire for a passenger car is normal or not various types of tire pressure monitoring system (TPMS) each having an air pressure sensor provided in the interior of the tire for measuring tire internal pressure or the like of the tire so that the system is capable of receiving information on air pressure transmitted via wireless communication from the air pressure sensor by a reception device provided on a vehicle body side and expressing a warning when the air pressure has dropped beyond an acceptable range (e.g. PTL 1).

CITATION LIST

Patent Literature

PTL 1: JP2004-314727 Laid-Open

SUMMARY

However, in the case of the conventional TPMS as described above which simply monitors only a decrease in internal pressure of a tire, a user (driver) cannot tell whether the warned abnormality is due to puncture or natural pressure drop and not a few of such users believe that the abnormality is due to natural pressure drop, taking no action after all. As a result, these users often continue to drive without noticing occurrence of an accident such as a nail piercing a tire, thereby possibly allowing serious damages to be caused in the tire.

The present invention has been contrived in view of the problems of the prior art as described above and an object thereof is provide a tire internal pressure warning system capable of notifying a user of whether abnormal tire pressure is due to puncture or natural pressure drop when the abnormal tire pressure is warned so that the user can quickly take an appropriate action.

In order to achieve the aforementioned object, the tire internal pressure warning system of the present invention comprises: an internal pressure data acquisition apparatus for obtaining data of internal pressure of each tire of a vehicle; and an information terminal device for determining whether there is a puncture-based failure or a failure resulting from a natural pressure drop, based on a change in the internal pressure of each tire received from the internal pressure data acquisition apparatus, and displaying a warning in accordance with the failure condition, wherein the information terminal device is adapted to judge, in determining whether there is a puncture-based failure or a failure resulting from a natural pressure drop based on data of differences in internal pressure between the respective tires, that puncture has occurred when a decrease in internal pressure of at least one tire is below a decrease reference value and a decrease in internal pressure of at least one tire exceeds the decrease reference value.

According to the present invention, it is possible to notify a user of whether abnormal tire pressure is due to puncture or natural pressure drop when the abnormal tire pressure is warned, so that the user can quickly take an appropriate action.

BRIEF DESCRIPTION OF THE DRAWINGS

The present invention will be further described below with reference to the accompanying drawings, wherein.

DETAILED DESCRIPTION

Figure 1:
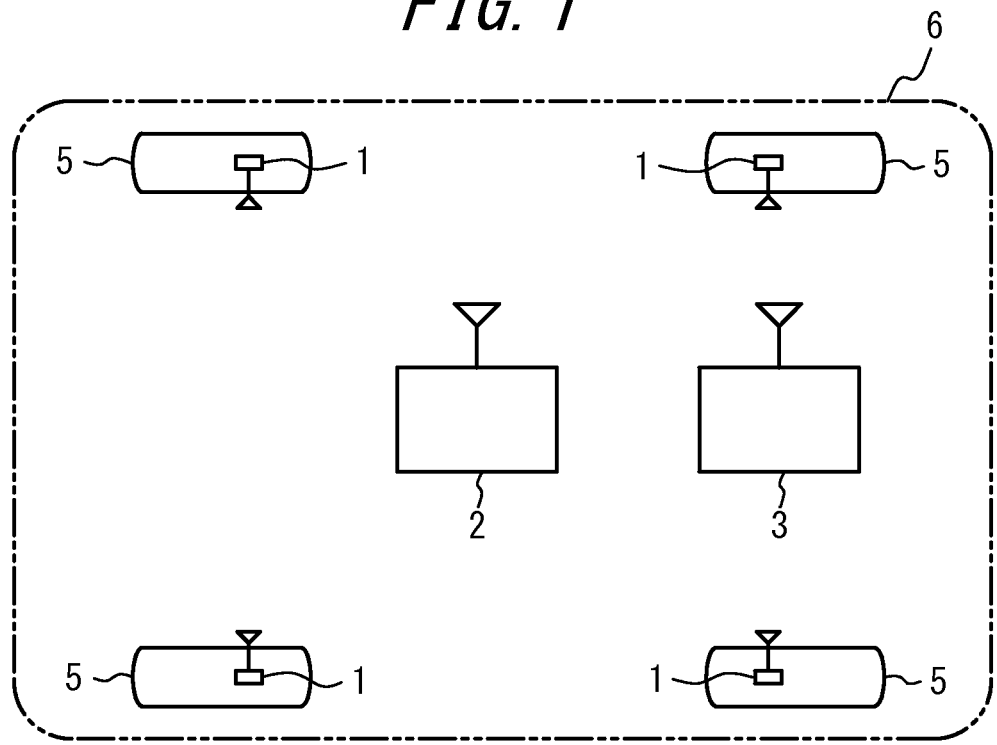
FIG. 1 is a block diagram of a tire internal pressure warning system according to one embodiment of the present invention.

An embodiment of the present invention will be described with reference to the drawings. FIG. 1 is a block diagram of a tire internal pressure warning system according to the embodiment of the present invention. The tire internal pressure warning system shown in FIG. 1 includes: an internal pressure data acquisition apparatus constituted of a TPMS (tire pressure monitoring system) sensor transmitter 1 and a TPMS receiver 2; and an information terminal device 3.

The TPMS sensor transmitter 1 is provided in the interior of each tire 5 of a vehicle 6 on either a tire wheel or an inner surface of the tire. The TPMS sensor transmitter 1 detects internal pressure of the tire 5 under a predetermined condition, e.g. when the vehicle speed is at least 40 km/hour, at a predetermined time interval, e.g. every one minute, and transmits an internal pressure value of the tire thus detected, as well as a sensor identification code (a sensor ID) associated with the tire, to the TPMS receiver 2 on the vehicle body side via wireless communication. The TPMS sensor transmitter 1 may be mounted on a wheel rim so as to be integral with a cylindrical tire valve for injecting air into the tire 5. Alternatively, the TPMS sensor transmitter 1 may be attached to an inner surface of the tire 5.

The TMPS receiver 2 receives wireless signals including the inner pressure value of the tire transmitted from the TPMS sensor transmitter 1 and relays the signals thus received to the information terminal device 3 by using a wire communication means such as Bluetooth.

Upon receiving the wireless signals including the internal pressure value of the tire transmitted from the TPMS receiver 2, the information terminal device 3 determines whether there is a puncture-based failure or a failure resulting from a natural pressure drop in the tire 5 based on changes in internal pressure and displays a warning in accordance with the failure condition on a display screen of the device.

Figure 2:
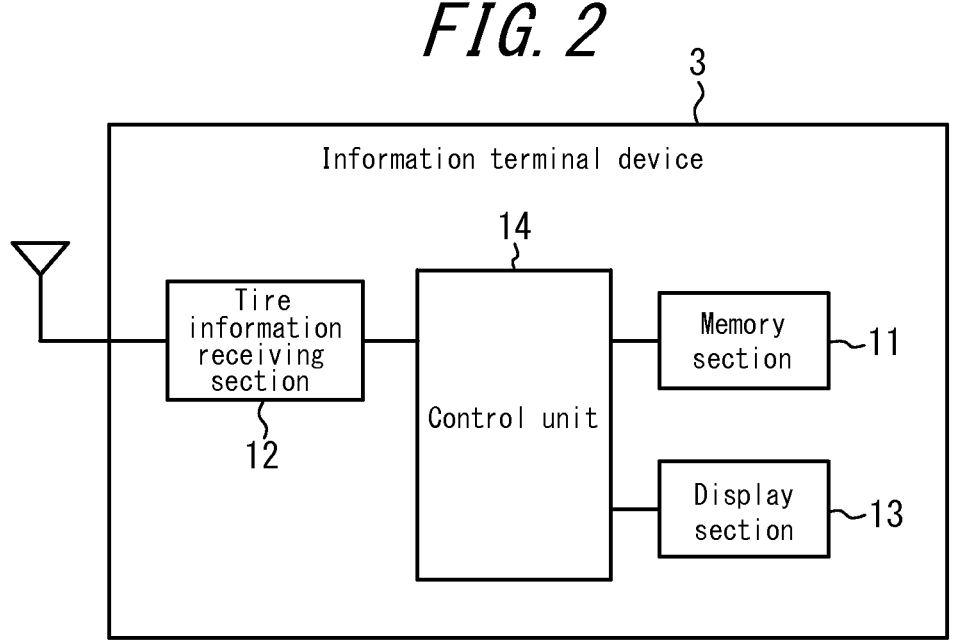
FIG. 2 is a block diagram showing an example of an information terminal device.

FIG. 2 is a block diagram showing an example of an information terminal device in the tire internal pressure warning system according to the present embodiment of the invention. The information terminal device 3 is constituted of a memory section 11, a tire information receiving section 12, a display section 13, and a control unit 14. The memory section 11 stores in advance a correspondence table for correlating the respective mounting positions of the tires 5 with corresponding sensor identification codes (sensor IDs) inherent to the respective TPMS sensor transmitters 11, an internal pressure reference value preset for each tire 5 in accordance with the type of the tire and the type of the vehicle 6, and the like. The tire information receiving section 12 is wirelessly connected to the TPMS receiver 2 via the wireless communication means such as Bluetooth. The display 13 displays various information. The control unit 14 determines whether there is a puncture-based failure or a failure resulting from a natural pressure drop in the tire 5 based on changes in internal pressure of the tires 5.

The signals including the internal pressure value of each tire transmitted from the TPMS sensor transmitter 1 via the TPMS receiver 2 are imparted with a sensor identification code, so that the control unit 14 can determine the mounting position of the tire in the vehicle based on which sensor identification code stored in the correspondence table correlates with the sensor identification code carried by the signals. Further, the control unit 14 determines whether there is a puncture-based failure (i.e. occurrence of abnormality such as a nail piercing a tire) or a failure resulting from a natural pressure drop in the tire 5 based on changes in internal pressure of the tires 5 and in the display section 13 (on the display screen thereof) displays for each tire mounting position a warning in accordance with the failure condition thereat.

The control unit 14 determines whether there is a puncture-based failure or a failure resulting from a natural pressure drop in the tires, based on at least a decrease in internal pressure relative to the internal pressure reference value and optionally a pressure decreasing rate preset for each tire in accordance with the type of the tire and the type of the vehicle and further optionally on data of differences in internal pressure between respective tires (four tires in a case of a standard-sized automobile). The information terminal device 3 can determine whether or not there is a puncture-based failure more accurately by detecting differences in internal pressure between respective tires and the like, as well. An internal pressure reference value may be set by a user for each tire with reference to the normal internal pressure prescribed for the tire in the JATMA standard or the like. A decrease reference value for determining whether there is a puncture-based failure or a failure resulting from a natural pressure drop in a tire has to be set in accordance with the type of the tire, the type of a vehicle on which the tire is mounted, and the climate of an area where the vehicle is used (e.g. in accordance with the climate of a cold area) because internal pressure of a tire changes depending on the outdoor temperature. The information terminal device 3 is adapted to allow such presetting and changes to be made flexibly.

Figure 3:
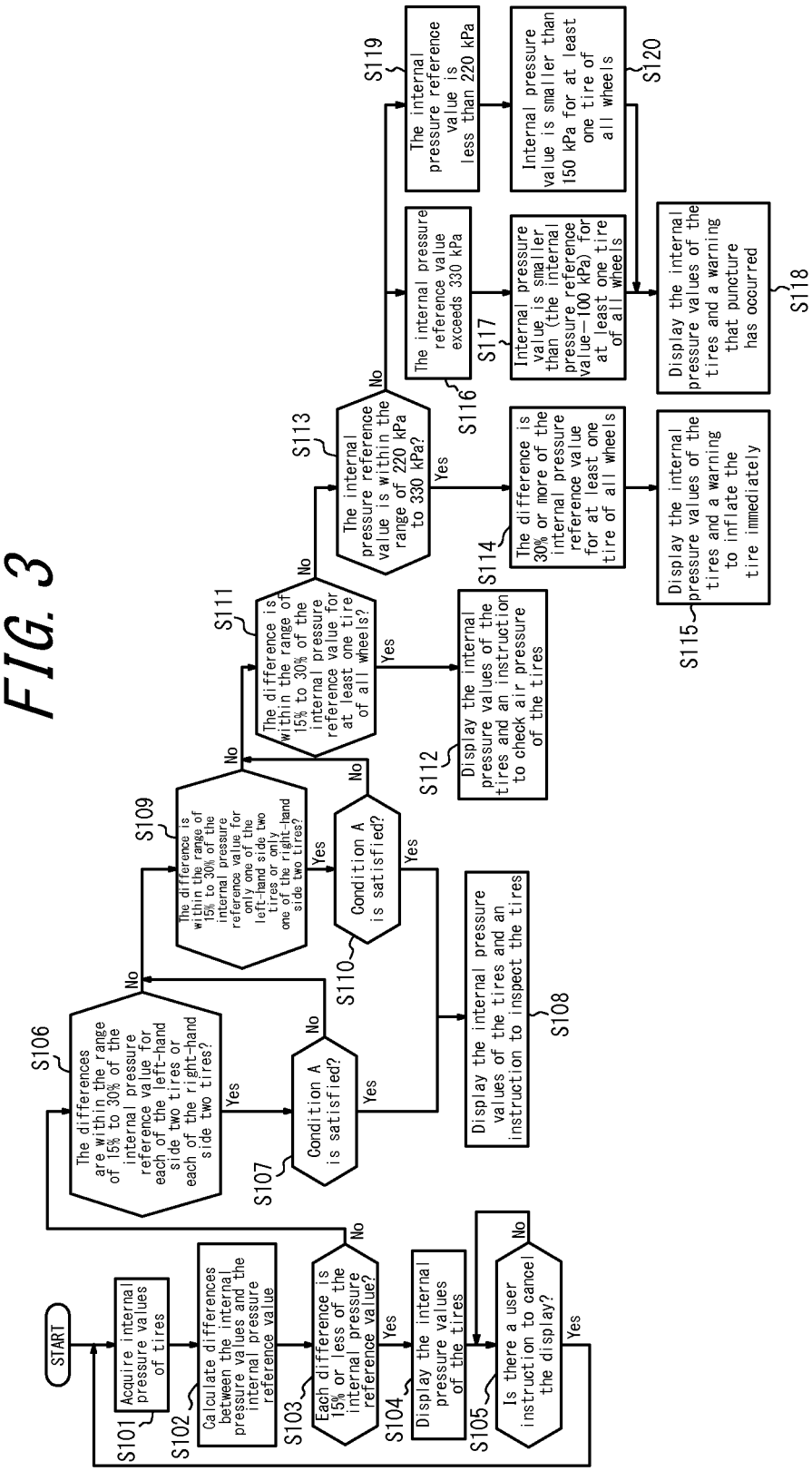
FIG. 3 is a flow chart for explaining operations of the information terminal device.

FIG. 3 is a flow chart for explaining operations to be made by the information terminal device according to the present embodiment of the invention in determining whether there is a puncture-based failure or a failure resulting from a natural pressure drop in each tire based on a decrease in internal pressure relative to the internal pressure reference value preset for the tire. In an example shown in FIG. 3, three different types of advisory warnings, i.e. "Please inspect tires", "Please check air pressure of tires" and "You must inflate the tire immediately", are made when the information terminal device has determined that there is a failure resulting from a natural pressure drop in the tire(s).

Figure 4A:
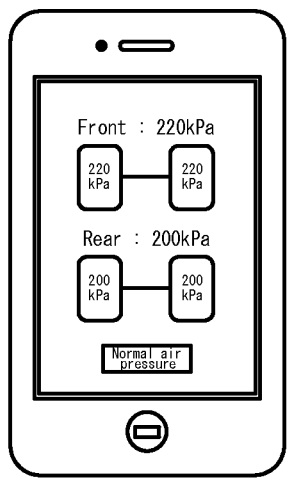
FIGS. 4A to 4E are views each showing an example of a display of internal pressure values and a caution/warning of respective tires displayed in a display section.

The control unit 14, when the vehicle starts driving, acquires an internal pressure value of each tire, as well as a sensor ID associated therewith, from the TPMS receiver 2 via the tire information receiving section 12 (S101) and calculates difference between the internal pressure value thus acquired and the internal pressure reference value (S102). The control unit 14 displays the internal pressure values of the respective tires in the display section 13 (S104) when the control unit has determined that the difference between the internal pressure value and the internal pressure reference value is 15% or less of the internal pressure reference value for every tire of every wheel (i.e. when the answer is "Yes" in S103) and stops the display operation to return to S101 when the user gave an instruction to cancel the display on the internal pressure (i.e. when the answer is "Yes" in S105). FIG. 4A is a view showing one example of internal pressure values of the respective tires displayed in the display section 13. The display section 13 displays message characters of "Normal air pressure" and internal pressure values of the respective tires at the respective tire mounting positions. A threshold value of the difference between each internal pressure value and the internal pressure reference value, for discerning whether there is abnormality or not in a tire, may be changed within the range of 10% to 20% of the internal pressure reference value in consideration of the outdoor temperature in the area where the tire is used (in a cold area, for example), although the threshold value (the decrease reference value) is 15% of the internal pressure reference value in S103.

Figure 4B:
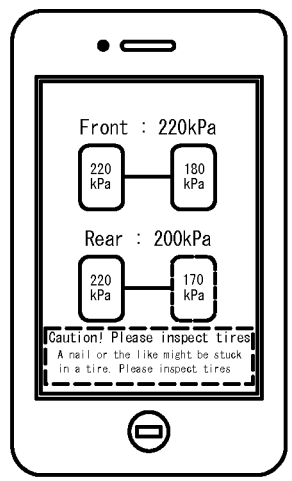

When the control unit 14 has determined that the difference between the internal pressure value and the internal pressure reference value is larger than 15% of the internal pressure reference value in at least one tire of the wheels (i.e. when the answer is "No" in S103), the control unit 14 then determines whether or not the difference between the internal pressure value and the internal pressure reference value is within the range of 15% to 30% of the internal pressure reference value for each of the left-hand side two tires or each of the right-hand side two tires (S106). The control unit 14 determines whether Condition A is satisfied or not (S107) when the difference between the internal pressure value and the internal pressure reference value is within the range of 15% to 30% of the internal pressure reference value for each of the left-hand side two tires or each of the right-hand side two tires (i.e. when the answer is "Yes" in S106). In the present embodiment, "Condition A" is a condition in which, provided that "D" represents difference between the highest internal pressure value of the tires of all wheels and the internal pressure value in the range of 70% to 85% of the internal pressure reference value of each of the left-hand side two tires/the right-hand side two tires (i.e. the tires each exhibiting a decrease in internal pressure beyond the decrease reference value), for each of the tires "D" is equal to or larger than a prescribed threshold value thereof, which prescribed threshold value is set to be 10% of the highest internal pressure, for example, but may be changed within the range of 5% to 15% of the highest internal pressure. When Condition A is satisfied, i.e. "D" is equal to or larger than a prescribed threshold value of the internal pressure difference (i.e. when the answer is "Yes" in S107), the control unit 14 causes the display section 13 to display the internal pressure values of the respective tires and "Please inspect tires" (warning of a nail stuck in a tire) by auto popup (S108). FIG. 4B is a view showing one example of internal pressure values of the respective tires and a warning message displayed in the display section 13 in this case. The display section 13 displays message characters of "Caution! Please inspect tires" and internal pressure values of the respective tires at the respective tire mounting positions.

When the answer is "No" in S106 or S107, the control unit 14 determines whether or not the difference between the internal pressure value and the internal pressure reference value is within the range of 15% to 30% of the internal pressure reference value for only one of the left-hand side two tires or only one of the right-hand side two tires (S109). The control unit 14 determines whether Condition A is satisfied or not (S110) when the difference between the internal pressure value and the internal pressure reference value is within the range of 15% to 30% of the internal pressure reference value for only one of the left-hand side two tires or only one of the right-hand side two tires (i.e. when the answer is "Yes" in S109). Provided that "D" represents difference between the highest internal pressure value of the tires of all wheels and the internal pressure value in the range of 70% to 85% of the internal pressure reference value of one of the left-hand side two tires/one of the right-hand side two tires, the control unit 14 causes the display section 13 to display the internal pressure values of the respective tires and "Please inspect tires" (warning of a nail stuck in a tire) by auto popup (S108) when "D" is equal to or larger than the prescribed threshold value thereof described above (i.e. when the answer is "Yes" in S110).

Figure 4C:
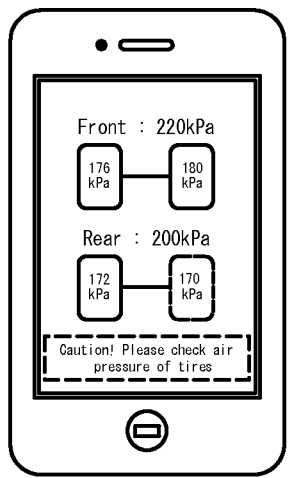

When the answer is "No" in S109 or S110, the control unit 14 determines whether or not the difference between the internal pressure value and the internal pressure reference value is within the range of 15% to 30% of the internal pressure reference value for at least one tire of all wheels (S111). Examples of the case determined to be "Yes" in S111 include a case where the two tires of the front wheels each exhibit such decreased internal pressure, a case where the front-left tire and the rear-right tire each exhibit such decreased internal pressure, and the like. The control unit 14 causes the display section 13 to display the internal pressure values of the respective tires and an instruction that "Please check air pressure of tires" by auto popup (S112) when the difference between the internal pressure value and the internal pressure reference value is within the range of 15% to 30% of the internal pressure reference value for at least one tire of all wheels (i.e. when the answer is "Yes" in S111). FIG. 4C is a view showing one example of internal pressure values of the respective tires and a warning message displayed in the display section 13 in this case. The display section 13 displays message characters of "Caution! Please check air pressure of tires" and internal pressure values of the respective tires at the respective tire mounting positions.

Figure 4D:
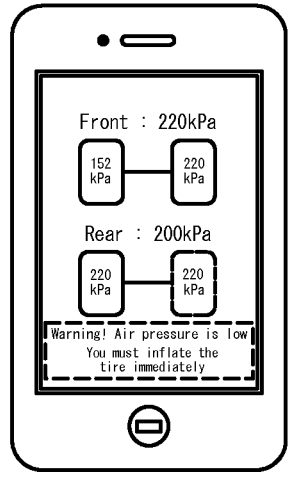

When the answer is "No" in S111, the control unit 14 determines whether the internal pressure reference value is within the range of 220 kPa to 330 kPa or not (S113). When the internal pressure reference value is within the range of 220 kPa to 330 kPa (i.e. when the answer is "Yes" in S113), the control unit 14 causes the display section 13 to display the internal pressure values of the respective tires and a warning that "You must inflate a tire immediately" by auto popup (S115) if the difference between the internal pressure value and the internal pressure reference value is 30% or more of the internal pressure reference value for at least one tire of all wheels (S114). FIG. 4D is a view showing one example of internal pressure values of the respective tires and a warning message displayed in the display section 13 in this case. The display section 13 displays message characters of "Warning! You must inflate the tire immediately" and internal pressure values of the respective tires at the respective tire mounting positions. In this regard, the tire presumably having the difference between the internal pressure value and the internal pressure reference value of 30% or more may be highlighted by blinking in red, to make sure that the user (driver) realizes necessity of inflating the tire immediately. A threshold value of the difference between the internal pressure value and the internal pressure reference value, for discerning necessity of urgent air inflation for a tire, may be changed within the range of 25% to 35% of the internal pressure reference value in consideration of the outdoor temperature in the area where the tire is used (in a cold area, for example), although the threshold value is 30% of the internal pressure reference value in S114.

Figure 4E:
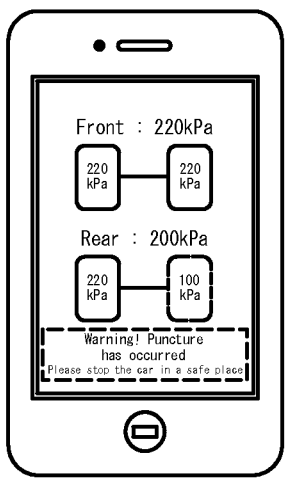

When the internal pressure reference value is not within the range of 220 kPa to 330 kPa (i.e. when the answer is "No" in S113), the control unit 14 causes the display section 13 to display the internal pressure values of the respective tires and a warning that "Puncture has occurred" by auto popup (S118) if the internal pressure reference value exceeds 330 kPa (S116) and an internal pressure value is smaller than (the internal pressure reference value—100 kPa) for at least one tire of all wheels (S117) or if the internal pressure reference value is less than 220 kPa (S119) and an internal pressure value is smaller than 150 kPa for at least one tire of all wheels (S120). FIG. 4E is a view showing one example of internal pressure values of the respective tires and a warning message displayed in the display section 13 in S118. The display section 13 displays message characters of "Warning! Puncture has occurred" and internal pressure values of the respective tires at the respective tire mounting positions. In this regard, the tire presumably having the internal pressure value smaller than (the internal pressure reference value−100 kPa) may be highlighted by blinking in red, to make sure that the user (driver) realizes occurrence of puncture. Further, the display section 13 may instruct the driver to stop the vehicle in this case. A threshold value of (the internal pressure reference value−100 kPa) in S117 may be changed within the range of (the internal pressure reference value−150 kPa) to (the internal pressure reference value−100 kPa). Similarly, a threshold value of 150 kPa in S120 may be changed within the range of 90 kPa to 150 kPa.

Further, when the control unit 14 determines whether or not there is a failure in the respective tires (four tires in a standard-sized automobile) based on data of differences in internal pressure between the tires (the control unit 14 determines that there is possibly a puncture-based failure in a tire in a case where a decrease in internal pressure of at least one tire is below a decrease reference value and a decrease in internal pressure of at least one tire exceeds the decrease reference value in the aforementioned example), the control unit 14 may determine that there is a tire failure and cause the display section 13 to display one of "Puncture has occurred" warming, "You must inflate a tire immediately" warning, "Please check air pressure of tires" instruction and "Please inspect tires" instruction to warn the driver of possible puncture if there exists a difference in internal pressure, exceeding e.g. 10% of the internal pressure reference value, between any two tires of all wheels because puncture has probably already occurred in a tire in such a state. The control unit 14 can enhance precision of puncture determination by determining such a state as described above to be a puncture state.

Yet further, when the control unit 14 determines whether or not there is a failure in the respective tires (four tires in a standard-sized automobile) based on data of differences in internal pressure between the tires, the control unit 14 may determine that there is a puncture-based failure and cause the display section 13 to warn the driver of puncture if only one tire, or only left-hand side tires (front-rear two left tires in a standard-sized vehicle), or only right-hand side tires (front-rear two right tires in a standard-sized vehicle) exhibit a significantly large decrease in internal pressure, e.g. if the internal pressure of the tire(s) is 150 kPa or less or (the internal pressure reference value−100 kPa), because puncture has probably already occurred in a tire in such a state. The control unit 14 can enhance precision of puncture determination by determining such a state as described above to be a puncture state.

Yet further, the control unit 14 may determine that there is a puncture-based failure when internal pressure of any of the tires is equal to or below a specific threshold value, e.g. 150 kPa or (the internal pressure reference value−100 kPa). The control unit 14 can enhance precision of puncture determination by setting such a threshold value as described above indicating a high possibility of puncture.

Yet further, the TPMS receiver 2 may determine whether there is a puncture-based failure or a failure resulting from a natural pressure drop in the tires, although the control unit 14 of the information terminal device 3 performs the function in the embodiment described above.

Yet further, a smartphone-like device may be used as the information terminal device 3 so that an application of the smartphone determines whether there is a puncture-based failure or a failure resulting from a natural pressure drop in the tires and a warning of puncture/natural pressure drop is made by a display of the smartphone.

The information terminal device 3 may further include GPS (Global Positioning System) and the memory section 11 may store in advance a database including at least positional data of service stations (e.g. shops, factories) where tire repair or exchange can be done. The control unit 14 acquires data of the current location of the vehicle by using GPS and searches the database when a warning of puncture/natural pressure drop is made in this case. The control unit 14 then checks the positions of the available service stations and the current position of the vehicle, extracts the service station closest to the vehicle, and causes the display section 13 to show a navigation display telling how to reach the service station thus extracted. The navigation display is, for example, a map showing the position of the closest service station and a route thereto from the vehicle. The user can have the puncture quickly repaired by using this navigation display showing how to reach the closest service station.

Alternatively, the control unit 14 may check the positions of the available service stations and the current position of the vehicle and extract the service station within a predetermined distance from the vehicle. The predetermined distance, which may be preset for each type of tires, for example, can be changed as desired. The control unit 14 causes the display section 13 to display information (e.g. shop name, address, telephone number, and the like) of the service stations thus extracted, makes the user select one of the service stations, and then causes the display section 13 to show a navigation display telling how to reach the service station thus selected. Accordingly, in this case the user can have the puncture repaired in his/her favorite service station by selecting the service station from a plurality of service stations situated close to the current vehicle position.

The information terminal device 3 may further include a wireless section for communicating with a base station via wireless communication networks in a case where an external server stores a database including at least positional data of service stations where tire repair or exchange can be done. The control unit 14 connects itself to the external server via the wireless section and searches the database in this case.

The information terminal device 3 shows a navigation display telling how to reach a service station preferably after confirming that the vehicle has stopped by using information from GPS and information from the internal pressure data acquisition apparatus. A user must make navigation operations according to a navigation display telling how to reach a service station in a state where the vehicle has completely stopped, in terms of safety. It is preferable to confirm that the vehicle has stopped by using information from the TPMS sensor transmitter 1, as well as information from GPS, to make the confirmation thoroughly reliable, although stoppage of the vehicle could be confirmed by only using GPS in a smartphone-like information terminal device. Failure by the information terminal device 3 in receiving data of internal pressure of tires from the TPMS sensor transmitter 1 reliably confirms that the vehicle has stopped because the TPMS sensor transmitter 1 transmits data of internal pressure of the tires at a predetermined time interval (e.g. every one minute) only when the vehicle is under a predetermined condition (e.g. the vehicle speed is 40 km/hour or higher) and the TPMS sensor transmitter 1 stops transmission of data while the vehicle is stopped.

The information terminal device 3 may determine that puncture has occurred and display a warning of puncture when internal pressure of a tire dropped to a specific threshold value or below during a navigation display telling how to reach a service station.

It is acceptable to integrate the TPMS receiver 2 and the information terminal device 3 into one body and install them in a car navigation system with GPS, so that a warning in accordance with the type of a failure is displayed on a screen of the car navigation system. Further, the car navigation system may have a database including at least positional data of service stations, so that it can acquire data of the current vehicle position by using GPS when a puncture warning is made, search the database, and display the position of a service station close to the current vehicle position on a display screen thereof.

As described above, according to the tire internal pressure warning system of the present invention, it is possible to notify a user of whether abnormal tire pressure is due to puncture or natural pressure drop when the abnormal tire pressure is warned, thereby allowing the user to take an appropriate action quickly.

Further, according to the tire internal pressure warning system of the present invention, a fuel consumption rate improves and early wear of a tire can be prevented because natural pressure drop is notified at an early stage.

REFERENCE SIGNS LIST

1 TPMS sensor transmitter
2 TPMS receiver
3 Information terminal device
5 Tire
6 Vehicle
11 Memory section
12 Tire information receiving section
13 Display section
14 Control unit

The invention claimed is:

1. A tire internal pressure warning system, comprising:
   an internal pressure data acquisition apparatus for obtaining data of internal pressure of each tire of a vehicle by directly measuring the internal pressure; and
   an information terminal device for determining whether there is a puncture-based failure or a failure resulting from a natural pressure drop, based on a change in the internal pressure of each tire received from the internal pressure data acquisition apparatus, and displaying a warning in accordance with the failure condition,
   wherein the information terminal device is adapted to judge, in determining whether there is a puncture-based failure or a failure resulting from a natural pressure drop based on data of differences in internal pressure between the respective tires, that
   i) a nail stuck has occurred when: difference between an internal pressure value thus measured and an internal pressure reference value is within the range of 15% to 30% of the internal pressure reference value for at least one of the left-hand side two tires or at least one of the right-hand side two tires; and difference between the highest internal pressure value of the tires of all wheels and the internal pressure value in the range of 70% to 85% of the internal pressure reference value of said tire is equal to or larger than a prescribed threshold value,
   ii) air pressure of the tires need be checked when difference between the internal pressure value and the internal pressure reference value is within the range of 15% to 30% of the internal pressure reference value for at least one tire of all wheels,
   iii) the tire must be inflated immediately when the internal pressure reference value is within the range of 220 kPa to 330 kPa and difference between the internal pressure value and the internal pressure reference value is 30% or more of the internal pressure reference value for at least one tire of all wheels,
   iv) puncture has occurred when the internal pressure reference value exceeds 330 kPa and the internal pressure value is smaller than (the internal pressure reference value−100 kPa) for at least one tire of all wheels or when the internal pressure reference value is less than 220 kPa and the internal pressure value is smaller than 150 kPa for at least one tire of all wheels.

2. The tire internal pressure warning system of claim 1, wherein the information terminal device is adapted to judge, in determining whether there is a puncture-based failure or a failure resulting from a natural pressure drop based on data of differences in internal pressure between the respective tires, that there is a puncture-based failure when only one tire, or only left-hand side tires, or only right-hand side tires each exhibit a decrease in internal pressure beyond the decrease reference value.

3. The tire internal pressure warning system of claim 1, wherein, provided that "D" represents difference between the highest internal pressure value of the tires each exhibiting a decrease in internal pressure below the decrease reference value and the internal pressure value of the tire exhibiting a decrease in internal pressure beyond the decrease reference value, the information terminal device is adapted to judge that: there is a puncture-based failure when D is equal to or larger than a prescribed threshold value thereof; and that there is a failure resulting from a natural pressure drop when D is smaller than the prescribed threshold value thereof.

4. The tire internal pressure warning system of claim 1, wherein the information terminal device is adapted to display one of "Puncture has occurred" warning, "You must inflate the tire immediately" warning, "Please check air pressure of tires" instruction and "Please inspect tires" instruction in accordance with the failure condition.

5. A tire internal pressure warning system, comprising:
   an internal pressure data acquisition apparatus for obtaining data of internal pressure of each tire of a vehicle; and
   an information terminal device for determining whether there is a puncture-based failure or a failure resulting from a natural pressure drop, based on a change in the internal pressure of each tire received from the internal pressure data acquisition apparatus, and displaying a warning in accordance with the failure condition,
   wherein the information terminal device is adapted to judge, in determining whether there is a puncture-based failure or a failure resulting from a natural pressure drop based on data of differences in internal pressure between the respective tires, that puncture has occurred when a decrease in internal pressure of at least one tire is below a decrease reference value and a decrease in internal pressure of at least one tire exceeds the decrease reference value,
   the information terminal device further includes Global Positioning System (GPS) and is adapted to display a warning in accordance with the failure condition and a navigation display telling how to reach a service station from the current vehicle position, and
   the information terminal device is adapted to show the navigation display telling how to reach a service station after confirming that the vehicle has stopped by using information from the GPS and information from the internal pressure data acquisition apparatus.

6. The tire internal pressure warning system of claim 5, wherein the information terminal device is adapted to determine that puncture has occurred and display a warning of puncture when internal pressure of a tire dropped to a specific threshold value or below while the navigation display telling how to reach a service station is shown.

7. The tire internal pressure warning system of claim 5, wherein the information terminal device is adapted to judge, in determining whether there is a puncture-based failure or a failure resulting from a natural pressure drop based on data of differences in internal pressure between the respective tires, that there is a puncture-based failure when only one tire, or only left-hand side tires, or only right-hand side tires each exhibit a decrease in internal pressure beyond the decrease reference value.

8. The tire internal pressure warning system of claim 5, wherein, provided that "D" represents difference between the highest internal pressure value of the tires each exhibiting a decrease in internal pressure below the decrease reference value and the internal pressure value of the tire exhibiting a decrease in internal pressure beyond the decrease reference value, the information terminal device is adapted to judge that: there is a puncture-based failure when D is equal to or larger than a prescribed threshold value thereof; and that there is a failure resulting from a natural pressure drop when D is smaller than the prescribed threshold value thereof.

9. The tire internal pressure warning system of claim 5, wherein the information terminal device is adapted to display one of "Puncture has occurred" warning, "You must inflate the tire immediately" warning, "Please check air pressure of tires" instruction and "Please inspect tires" instruction in accordance with the failure condition.

* * * * *